(12) United States Patent
Maeda et al.

(10) Patent No.: US 10,193,625 B2
(45) Date of Patent: Jan. 29, 2019

(54) MODULATION SYSTEM AND MODULATION METHOD

(71) Applicant: Panasonic Intellectual Property Corporation of America, Torrance, CA (US)

(72) Inventors: Toshiyuki Maeda, Kanagawa (JP); Masanori Oshimi, Tokyo (JP); Hiroyuki Oku, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 15/697,498

(22) Filed: Sep. 7, 2017

(65) Prior Publication Data

US 2017/0366261 A1  Dec. 21, 2017

Related U.S. Application Data

(63) Continuation of application No. PCT/JP2017/003273, filed on Jan. 31, 2017.
(Continued)

(30) Foreign Application Priority Data

May 31, 2016 (JP) ................................ 2016-109587

(51) Int. Cl.
*H04B 10/50* (2013.01)
*H04B 10/116* (2013.01)
(Continued)

(52) U.S. Cl.
CPC ....... *H04B 10/116* (2013.01); *H04B 10/1125* (2013.01); *H04B 10/1141* (2013.01);
(Continued)

(58) Field of Classification Search
CPC .......................... H04B 10/502; H04B 10/5053
See application file for complete search history.

(56) References Cited

U.S. PATENT DOCUMENTS

2002/0167701 A1  11/2002  Hirata
2008/0181614 A1*  7/2008  Ann ................... H04B 10/1141
398/140
(Continued)

FOREIGN PATENT DOCUMENTS

JP  2002-290335  10/2002
JP  2011-138727  7/2011

OTHER PUBLICATIONS

International Search Report of PCT application No. PCT/JP2017/003273 dated Apr. 11, 2017.

*Primary Examiner* — Shi K Li
(74) *Attorney, Agent, or Firm* — Greenblum & Bernstein, P.L.C.

(57) ABSTRACT

A system with which any abnormality can be easily found is provided. A system includes: a first modulator that generates a control signal and modulates an input signal in accordance with the generated control signal, to control luminance of a first light source that emits light according to the modulated input signal, the first modulator outputting the control signal; a second modulator that acquires the control signal output from the first modulator and modulates an input signal in accordance with the control signal, to control luminance of a second light source that emits light according to the modulated input signal, the second modulator outputting the control signal. The first modulator generates, as a light ID signal, a control signal for transmitting a visible light signal by luminance variations of the first light source, and acquires a light information signal being the control signal output from the second modulator.

16 Claims, 12 Drawing Sheets

Related U.S. Application Data

(60) Provisional application No. 62/305,070, filed on Mar. 8, 2016.

(51) Int. Cl.
*H04B 10/112* (2013.01)
*H04B 10/114* (2013.01)
*H04N 21/436* (2011.01)
*H04B 10/516* (2013.01)
*H05B 37/03* (2006.01)
*H04B 3/54* (2006.01)

(52) U.S. Cl.
CPC ....... *H04B 10/1149* (2013.01); *H04B 10/516* (2013.01); *H04N 21/43615* (2013.01); *H05B 37/032* (2013.01); *H04B 3/54* (2013.01); *H04B 2203/5408* (2013.01)

(56) References Cited

U.S. PATENT DOCUMENTS

| | | | | |
|---|---|---|---|---|
| 2010/0034540 A1* | 2/2010 | Togashi | ............... | H04B 10/116 398/118 |
| 2010/0209119 A1* | 8/2010 | Lee | ................... | H04B 10/1149 398/183 |
| 2017/0337963 A1* | 11/2017 | Takagimoto | ........ | G11C 11/4063 |

* cited by examiner

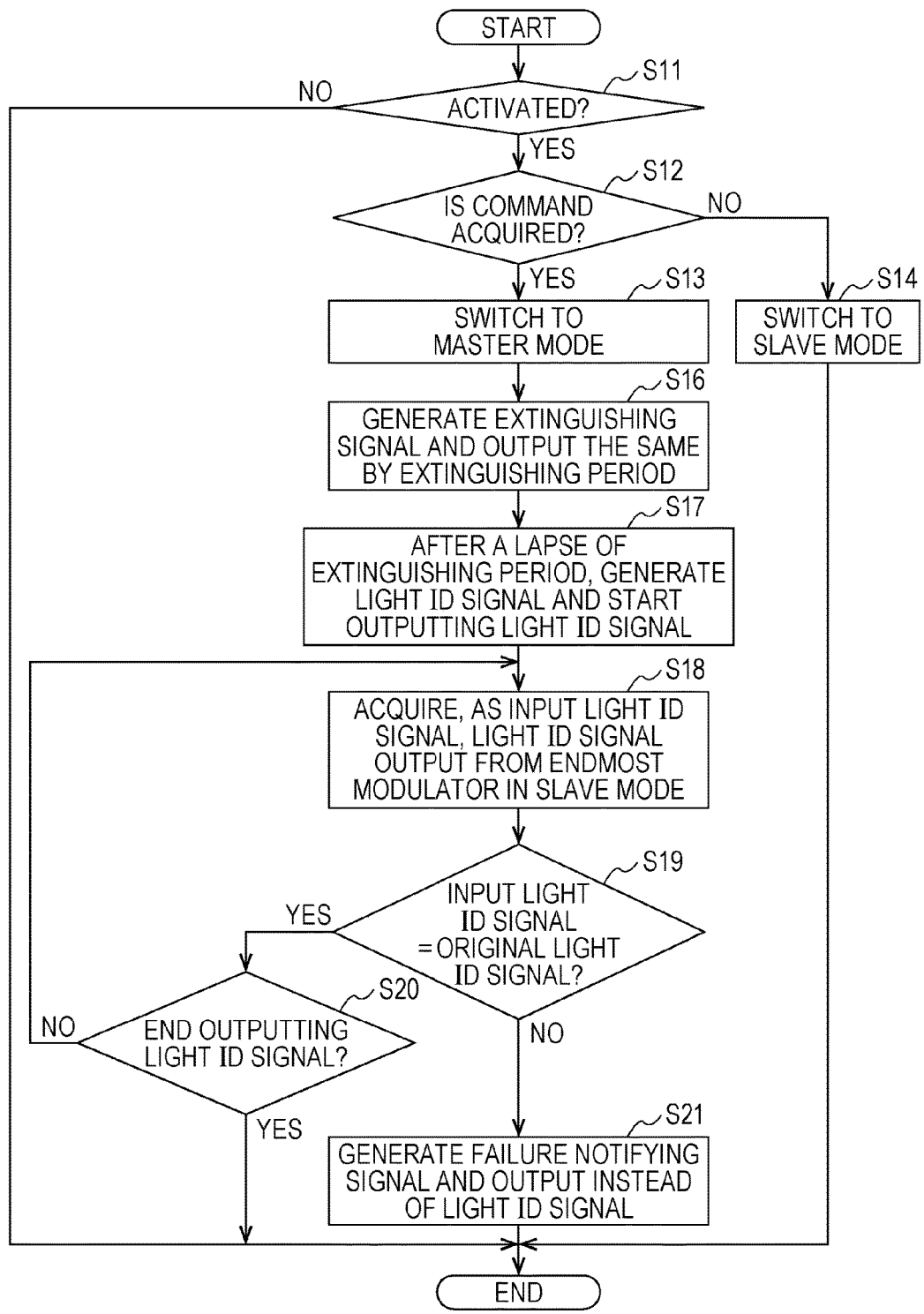

MODULATION SYSTEM AND MODULATION METHOD

BACKGROUND

1. Technical Field

The present disclosure relates to a modulation system and a modulation method for modulating an input signal.

2. Description of the Related Art

Recent home networks have been actively adopting the connected home appliance functions in which various home appliances are connected to a network. The home appliance functions are implemented by AV appliances being connected through the IP (Internet Protocol) connection based on Ethernet (registered trademark) or a wireless LAN (Local Area Network), and additionally by a home energy management system (HEMS), which manages power consumption in view of environmental problems and turns ON/OFF the power supply away from home. On the other hand, some home appliances lack full processing capacity for realizing the communication function, or have difficulty in realizing the communication function in terms of costs.

In order to solve such problems, PTL 1 discloses an optical spatial transmission apparatus for transmitting information through a free space using light. PTL 1 discloses the technique of realizing efficient communication among devices with a limited number of transmission apparatuses, by establishing communication using a plurality of monochromatic color light sources of illumination light.

Further, according to the technique disclosed in PTL 1, information is transmitted by illumination light, by modulating an input signal being an electric waveform supplied to the light sources.

CITATION LIST

Patent Literature

PTL 1: Unexamined Japanese Patent Publication No. 2002-290335

However, with the technique disclosed in PTL 1, unfortunately any abnormality of the devices cannot be easily found.

SUMMARY

One non-limiting and exemplary embodiment provides a system and a method with which any abnormality can be easily found.

In one general aspect, the techniques disclosed here feature a system including: a first modulator that generates a control signal and modulates an input signal in accordance with the generated control signal, to control luminance of a first light source that emits light according to the modulated input signal, the first modulator outputting the control signal; and a second modulator that acquires the control signal output from the first modulator and modulates the input signal in accordance with the control signal, to control luminance of a second light source that emits light according to the modulated input signal, the second modulator outputting the control signal. In this system, the first modulator generates, as a light information signal, a control signal for transmitting a visible light signal by luminance variations of the first light source, and the first modulator acquires the light information signal being the control signal output from the second modulator.

With the system of the present disclosure, any abnormality can be easily found.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that these general and specific aspects may be implemented using a system, a method, an integrated circuit, a computer program, or a computer-readable recording medium such as a CD-ROM, or any combination of systems, methods, integrated circuits, computer programs, or computer-readable recording media.

BRIEF DESCRIPTION OF THE DRAWINGS

FIG. 9 is a flowchart showing a processing operation of an MCU of the modulator according to the exemplary embodiment;

DETAILED DESCRIPTION

Underlying Knowledge Forming Basis of the Present Disclosure

Figure 1:
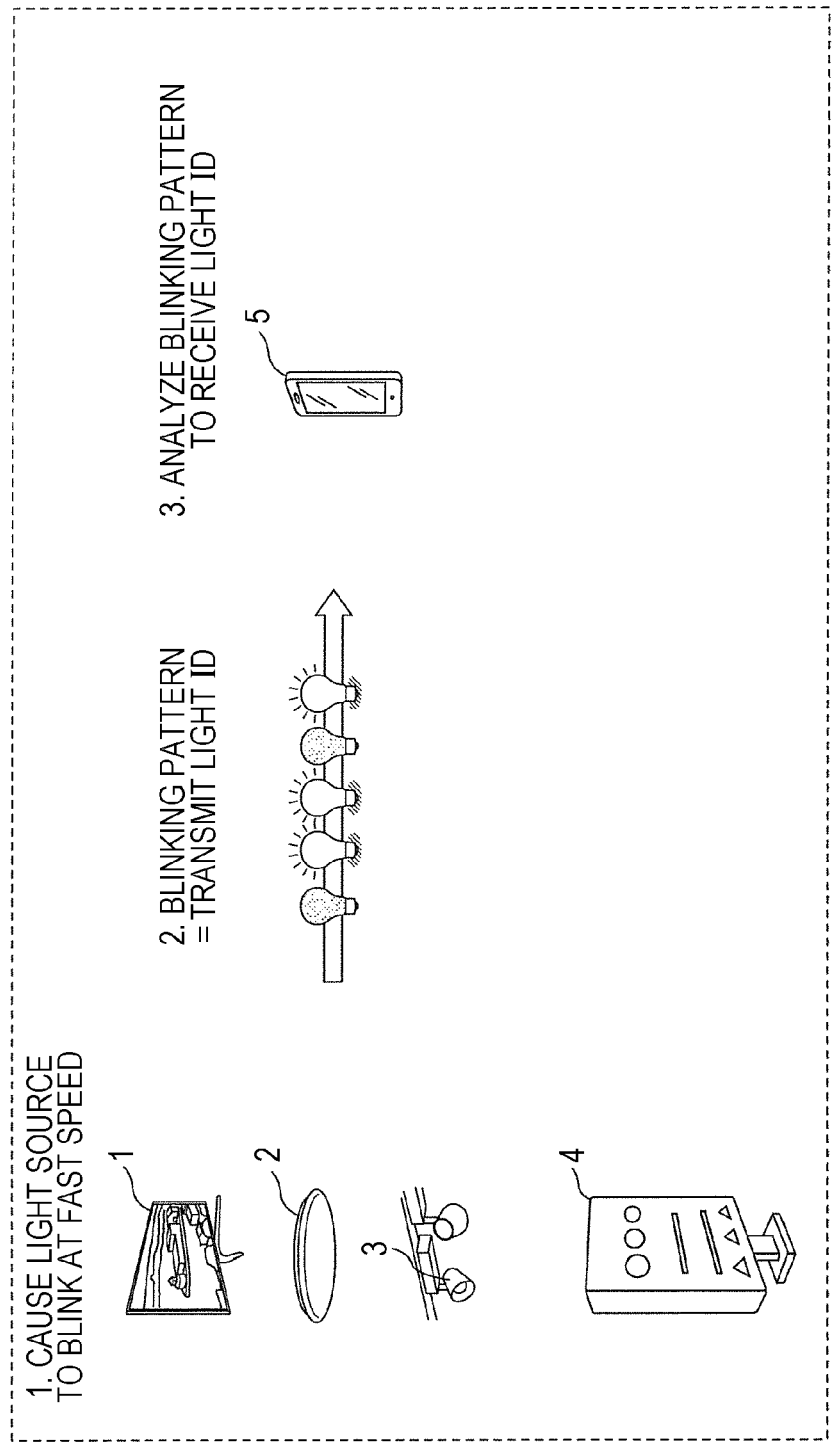
FIG. 1 is an explanatory diagram of a visible light communication system.

FIG. 1 is an explanatory diagram of a visible light communication system.

The visible light communication system includes a transmitter that includes a light source for transmitting information as a visible light signal, and a receiver that receives the visible light signal from the light source.

The transmitter may be, for example, television 1 that includes light emitting diodes (LEDs) being the light source as backlight, illumination device 2 or 3 that includes LEDs being the light source, or digital signage 4 that includes LEDs as the light source. The transmitter causes the light source to blink at fast speed, thereby transmitting a visible light signal realized by a blinking pattern of the light source. The blinking pattern represents transmission-target information, that is, a so-called light ID (identifier). Further, the transmitter includes a modulator that switches the signal level of an input signal being the supply voltage of the light source between High and Low for causing the light source to blink, that is, modulates the input signal.

The receiver is, for example, smartphone 5, and includes an image sensor of the rolling shutter scheme such as a complementary metal oxide semiconductor (CMOS). The image sensor captures an image of the transmitter as a subject. By this capturing, an image showing a stripe pattern of emission lines corresponding to exposure lines included in the image sensor is acquired. The stripe pattern reflects the blinking pattern of the light source of the transmitter. The receiver analyzes the stripe pattern, that is, the blinking pattern, to obtain the light ID.

Here, there are some cases in which the luminance of the visible light signals must be intensified such that the receiver can easily acquire the light ID. In such cases, the transmitter must cause a plurality of light sources to blink in synchronization with each other. That is, the transmitter must include a modulation system that includes a plurality of modulators for modulating the input signals of a plurality of light sources in synchronization with each other.

While the transmitter employing such a modulation system is capable of causing a plurality of light sources to blink in synchronization with each other, unfortunately, abnormality occurring in any of the modulators is difficult to detect. The technique disclosed in PTL 1 cannot cope with this problem.

In order to solve such a problem, a system according to one aspect of the present disclosure includes: a first modulator that generates a control signal and modulates an input signal in accordance with the generated control signal, to control luminance of a first light source that emits light according to the modulated input signal, the first modulator outputting the control signal; and a second modulator that acquires the control signal output from the first modulator and modulates the input signal in accordance with the control signal, to control luminance of a second light source that emits light according to the modulated input signal, the second modulator outputting the control signal. In this system, the first modulator generates, as a light information signal, the control signal for transmitting a visible light signal by luminance variations of the first light source, and the first modulator acquires the light information signal being the control signal output from the second modulator.

Thus, an input signal is modulated in accordance with an identical light information signal (specifically, a light ID signal) at each of the first modulator and the second modulator, and is output to the first light source and the second light source. Accordingly, the luminance variations of the first light source and those of the second light source can be synchronized with each other, whereby a visible light signal of a high luminance can be transmitted. Further, the light information signal output from the second modulator is acquired by the first modulator. Accordingly, the first modulator can determine whether or not the light information signal generated by the first modulator itself has been correctly acquired by the second modulator, that is, whether or not the second modulator has failed or not. Specifically, by the modulation of the input signal in accordance with the light information signal by the second modulator, whether or not the luminance of the second light source varies in synchronization with the first light source can be determined. As a result, abnormality in the system can be easily found.

Further, the system may further include a plurality of second modulators each structured as the second modulator and arranged in a predetermined order to form an array. In this system, the plurality of second modulators each acquire and output the control signal in accordance with the order in the array of the plurality of second modulators, such that the control signal is relayed from a top to an end of the array, and the first modulator acquires, as an input light information signal, the light information signal being the control signal output from an endmost one of the second modulators in the array.

Thus, also in the case where the system includes a plurality of second modulators, the light information signal generated by the first modulator is successively relayed in the plurality of second modulators in order, and ultimately acquired by the first modulator. Accordingly, the first modulator can determine whether or not the light information signal generated by the first modulator itself has been correctly acquired by the plurality of second modulators, that is, whether or not at least one of the plurality of second modulators has failed.

Further, the first modulator may determine whether or not at least one of the plurality of second modulators has failed based on the input light information signal.

Still further, the first modulator may determine whether or not the input light information signal is correct, and when the first modulator determines that the input light information signal is not correct, the first modulator may determine that at least one of the plurality of second modulators has failed. For example, the first modulator may determine that the input light information signal is not correct when the input light information signal is different from an original light information signal being the light information signal generated by the first modulator. Specifically, the first modulator may determine that the input light information signal is not correct when the original light information signal is at one of two different signal levels and the input light information signal is at other one of the two different signal levels.

Alternatively, the first modulator may determine that the input light information signal is not correct when a frequency of the input light information signal is different from a frequency of the original light information signal. In this case, the first modulator may determine that the input light information signal is not correct when the frequency of the input light information signal is higher than the frequency of the original light information signal.

Alternatively, the first modulator may determine that the input light information signal is not correct when a duty ratio of the input light information signal is different from a duty ratio of the original light information signal. In this case, the first modulator may determine that the input light information signal is not correct when a difference between the duty ratio of the input light information signal and the duty ratio of the original light information signal is equal to or greater than a predetermined value.

Thus, whether or not at least one of the second modulators has failed can be determined more properly.

Further, when the first modulator determines that at least one of the plurality of second modulators has failed, the first modulator may further generate and output, as the control signal, a failure notifying signal that causes the first light source to blink in a pattern that is visually recognizable to a human. Alternatively, when the first modulator determines that at least one of the plurality of second modulators has failed, the first modulator may further generate and output, as the control signal, a failure notifying signal that extinguishes the first light source.

Thus, for example, even if the number of the second light sources being extinguished by the failure of any second modulator is small and therefore the user cannot easily found the failure just by the extinguishing of those second light sources, the remaining great number of second light sources blink or are extinguished in a pattern that is visually recognizable to a human. Accordingly, the user can easily find that at least one of the plurality of second modulators has failed.

Further, an illumination device according to one aspect of the present disclosure may be an illumination device that includes the above-described system. Further, a display according to one aspect of the present disclosure may be a display that includes the above-described system. Still further, a projector according to one aspect of the present disclosure may be a projector that includes the above-described system.

In the following, with reference to the drawings, a specific description will be given of an exemplary embodiment.

Note that, the exemplary embodiment described in the following shows a generic or specific example. The numerical values, shapes, materials, constituents, positions and connection manners of the constituents, steps, the order of the steps, and the like described in the exemplary embodiment are of an exemplary nature, and not intended to limit the present disclosure. Further, of those constituents in the exemplary embodiment, those not described in independent claims representing the most generic concept are shown as arbitrary constituents.

Note that, the drawings are schematic diagrams, and not necessarily strictly illustrate. Further, throughout the drawings, identical constituent members are denoted by an identical reference sign.

Exemplary Embodiment

Figure 2:
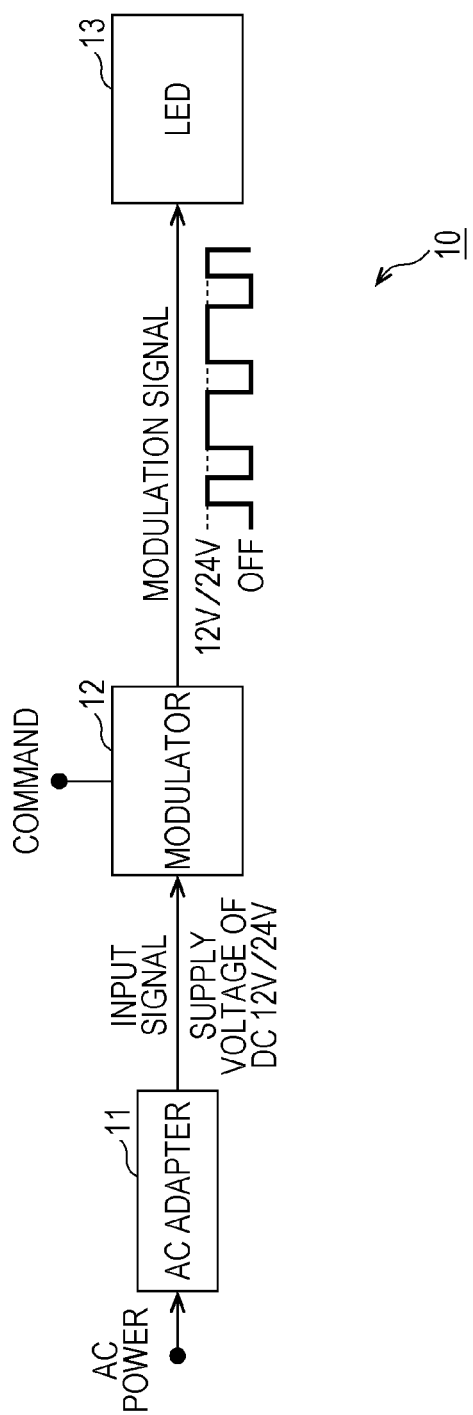
FIG. 2 is a block diagram showing the structure of a transmission unit included in a transmitter according to an exemplary embodiment.

FIG. 2 is a block diagram showing the structure of a transmission unit included in a transmitter according to the present exemplary embodiment.

The transmitter includes transmission unit 10. Transmission unit 10 includes AC adapter 11, modulator 12, and LED 13.

AC adapter 11 converts commercial AC power to DC power. The voltage of the DC power is the supply voltage of LED 13, and is 12 V or 24 V, for example.

Modulator 12 acquires the DC power supplied from AC adapter 11. Then, modulator 12 modulates the voltage value of the DC power, that is, a signal represented by the supply voltage (hereinafter referred to as the input signal). Here, modulator 12 modulates the input signal in accordance with the mode. There exist a master mode and a slave mode. Modulator 12 in the master mode acquires a command, and generates a control signal in accordance with the command and modulates the input signal in accordance with the control signal. On the other hand, modulator 12 in the slave mode acquires a control signal from an external source, and modulates the input signal in accordance with the control signal. Modulator 12 outputs the modulated input signal (hereinafter referred to as the modulation signal) to LED 13.

Note that, the modulation signal shows a signal level of 12 V or 24 V (High) and a signal level of 0 V (Low).

LED 13 lights up, blinks, or is extinguished according to the modulation signal output from modulator 12, that is, the modulated supply voltage. That is, LED 13 lights up when the signal level of the modulation signal is 12 V or 24 V, and is extinguished when the signal level of the modulation signal is 0 V. Note that, the present exemplary embodiment does not specify positive logic and negative logic in LED 13 lighting up and in its being extinguished. That is, LED 13 may light up when the signal level of the modulation signal is High and may be extinguished when the signal level is Low; or conversely, LED 13 may light up when the signal level of the modulation signal is Low and may be extinguished when the signal level is High.

When the control signal is a control signal for transmitting a visible light signal by luminance variations of LED 13 (hereinafter referred to as the light ID signal), the visible light signal is transmitted by the luminance variations of LED 13.

Here, when light quantity is insufficient with just single transmission unit 10, the transmitter includes a plurality of transmission units 10. Note that, the power consumption of modulator 12 is for example 50 W. Further, the plurality of transmission units 10 must be in synchronization with each other for transmitting an identical visible light signal.

Figure 3:
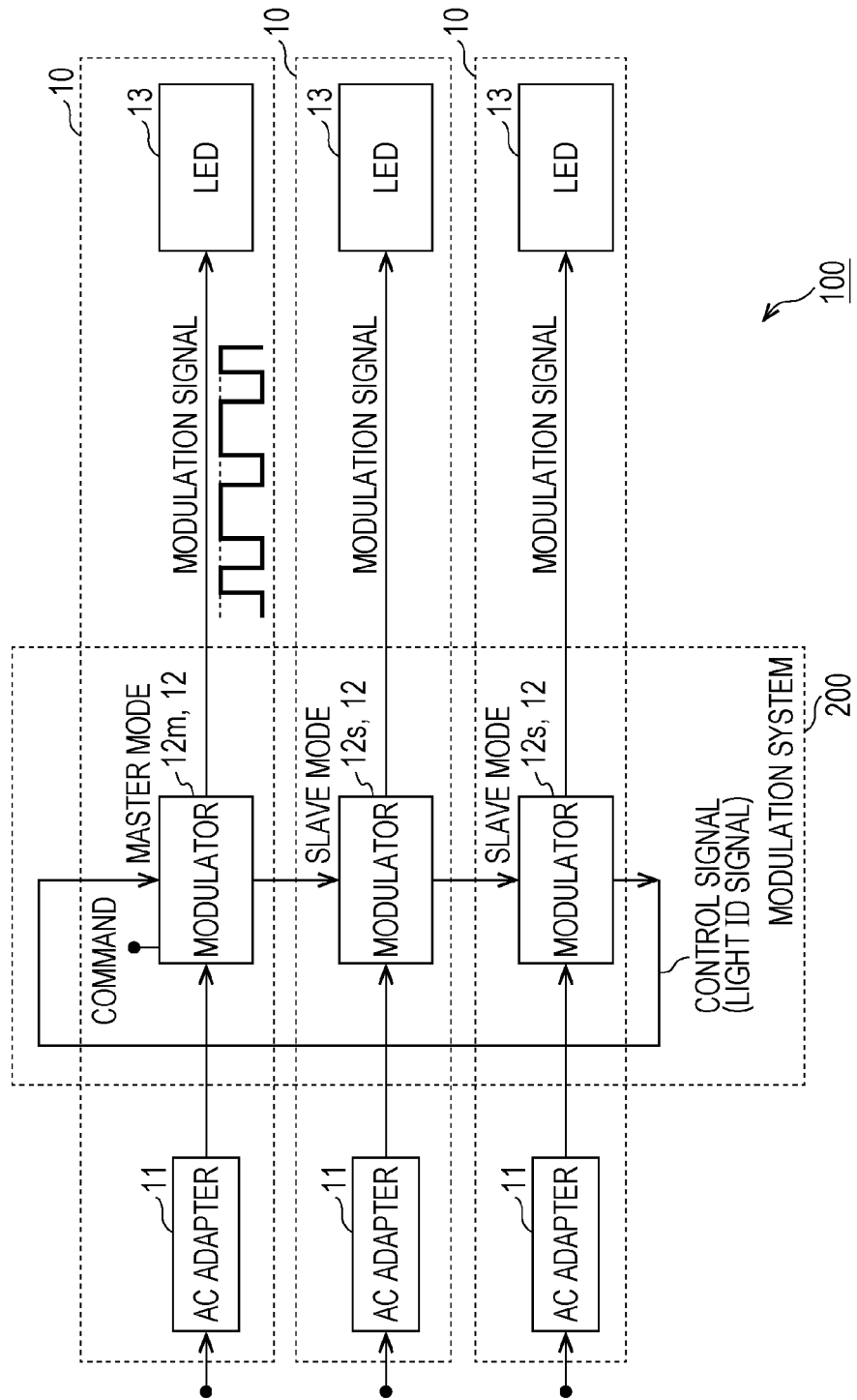
FIG. 3 is a block diagram showing the structure of the transmitter including a modulation system according to the exemplary embodiment.

FIG. 3 is a block diagram showing the structure of the transmitter including a modulation system according to the present exemplary embodiment.

Transmitter 100 includes a plurality of transmission units 10. Modulator 12 of one of the plurality of transmission units 10 is set to the master mode, while modulators 12 of remaining transmission units 10 are set to the slave mode. In the following, modulator 12 set to the master mode or modulator 12 in the master mode is referred to as master modulator 12$m$, and modulators 12 set to the slave mode or modulators 12 in the slave mode are referred to as slave modulators 12$s$.

Modulation system 200 according to the present exemplary embodiment includes single master modulator 12$m$ and a plurality of slave modulators 12$s$.

As described above, master modulator 12$m$ generates a control signal, and modulates an input signal in accordance with the control signal. Then, master modulator 12$m$ outputs the control signal to slave modulators 12$s$.

Slave modulators 12$s$ acquire the control signal output from master modulator 12$m$ and modulate an input signal in accordance with the control signal. Then, slave modulators 12$s$ output the control signal.

Here, the plurality of slave modulators 12$s$ are arranged in a predetermined order. In other words, the plurality of slave modulators 12$s$ form an array. First slave modulator 12$s$ directly acquires a control signal from master modulator 12$m$, and outputs the control signal. Second and following slave modulators 12$s$ each acquire the control signal from immediately preceding slave modulator 12$s$ in the array. That is, second and following slave modulators 12$s$ indirectly acquire the control signal output from master modulator 12$m$, via at least one another slave modulator 12$s$. In this manner, the plurality of slave modulators 12$s$ each acquire the control signal and output the acquired light ID signal according to the order in the array, such that the control signal is relayed from the top to the end of the array. Note that, the delay time from when slave modulator 12$s$ acquires a control signal and until when slave modulator 12$s$ outputs the acquired control signal is 250 ns or less.

In this manner, the control signal is quickly transmitted from master modulator 12m to slave modulators 12s. Then, master modulator 12m and the plurality of slave modulators 12s each modulate the input signal in accordance with the control signal, and output the modulation signal being generated by the modulation. As a result, all LEDs 13 included in transmitter 100 are synchronized with each other in terms of the luminance.

Further, when the control signal is a light ID signal for transmitting a visible light signal by the luminance variations of LEDs 13, the visible light signal is transmitted by the synchronized luminance variations of all LEDs 13 included in transmitter 100.

Here, master modulator 12m acquires the light ID signal output from endmost slave modulator 12s in the array. Based on the light ID signal output from endmost slave modulator 12s, master modulator 12m determines whether or not any of slave modulators 12s included in transmitter 100 has failed.

Figure 4:
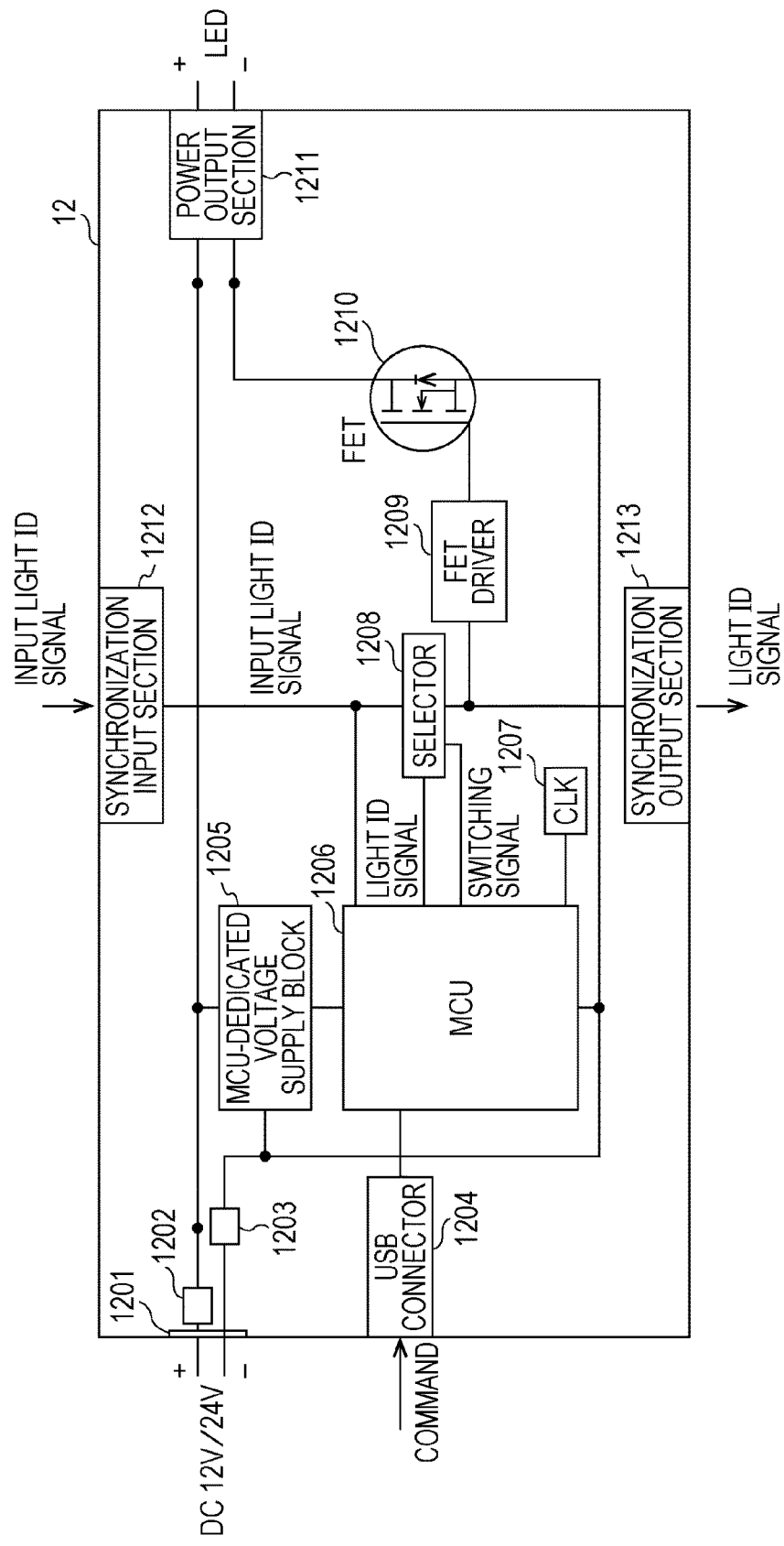
FIG. 4 is a circuit configuration diagram of a modulator included in the modulation system according to the exemplary embodiment.

FIG. 4 shows the circuit configuration of one modulator 12 included in modulation system 200 according to the present exemplary embodiment.

Modulator 12 includes power input section 1201, fuse 1202, reverse polarity protection circuit 1203, USB connector 1204, MCU-dedicated voltage supplying block 1205, MCU 1206, clock 1207, selector 1208, FET driver 1209, FET 1210, power output section 1211, synchronization input section 1212, and synchronization output section 1213.

Power input section 1201 is connected to the output side of AC adapter 11. Specifically, the positive pole and the negative pole of power input section 1201 are respectively connected to the positive pole and the negative pole on the output side of AC adapter 11. Power input section 1201 acquires the supply voltage of DC power supplied from AC adapter 11 as an input signal.

Power output section 1211 is connected to LED 13. Specifically, the positive pole and the negative pole of power output section 1211 are respectively connected to the positive pole and the negative pole of LED 13.

Fuse 1202 is connected between the positive pole of power input section 1201 and the positive pole of power output section 1211.

Reverse polarity protection circuit 1203 is, for example, a diode or a FET, and connected between the negative pole of power input section 1201 and the source of FET 1210. Further, the drain of FET 1210 is connected to the negative pole of power output section 1211. Reverse polarity protection circuit 1203 configured in this manner functions to protect the electronic devices in modulator 12 even if power input section 1201 and AC adapter 11 are reversely connected to each other in terms of polarity.

FET 1210 functions as a switch that switches the connection state between power input section 1201 and power output section 1211 between ON and OFF, depending on the output from FET driver 1209. When FET 1210 is ON, the supply voltage is supplied from power input section 1201 to LED 13 via power output section 1211. On the other hand, when FET 1210 is OFF, the supply voltage is not supplied to LED 13. Such switching exerted by FET 1210 causes LED 13 to light up, blink, or be extinguished. When the switching is exerted in accordance with a light ID signal, a visible light signal is transmitted from LED 13.

MCU-dedicated voltage supplying block 1205 generates, from the supply voltage (e.g., 12 V or 24 V) acquired by power input section 1201, the supply voltage for MCU 1206 and supplies the supply voltage to MCU 1206.

USB connector 1204 is connected to a plug of a Universal Serial Bus (USB) cable, to acquire a command from a source outside modulator 12 via the USB cable, and outputs the command to MCU 1206.

Synchronization input section 1212 acquires a control signal from an external source, and outputs the control signal to MCU 1206 and selector 1208. Note that, in the case where the control signal acquired from an external source by synchronization input section 1212 is a light ID signal, hereinafter the control signal is referred to as the input light ID signal.

In accordance with the switching signal from MCU 1206, selector 1208 switches the control signal output to FET driver 1209 and synchronization output section 1213. That is, selector 1208 switches the control signal output to FET driver 1209 and synchronization output section 1213 between a control signal generated by MCU 1206 and a control signal acquired by synchronization input section 1212. For example, when the control signal is a light ID signal, selector 1208 switches the light ID signal output to FET driver 1209 and synchronization output section 1213 between a light ID signal generated by MCU 1206 and an input light ID signal acquired by synchronization input section 1212. Note that, when the control signal generated by MCU 1206 is a light ID signal, hereinafter the generated light ID signal is referred to as the original light ID signal.

FET driver 1209 acquires a control signal (e.g., a light ID signal) from selector 1208, and switches FET 1210 in accordance with the control signal.

Synchronization output section 1213 acquires a control signal (e.g., a light ID signal) output from selector 1208, and outputs the control signal to the outside of modulator 12.

MCU 1206 is a processor, which operates by being supplied with supply voltage from MCU-dedicated voltage supplying block 1205. This operation is performed according to clock signals from clock 1207.

Specifically, when MCU 1206 acquires a command from USB connector 1204, MCU 1206 switches, with a switching signal, a control signal output from selector 1208 to a control signal generated by MCU 1206. By this switching, modulator 12 is set to the master mode. Further, MCU 1206 generates, as a control signal, a light ID signal corresponding to the command, and outputs the generated light ID signal as an original light ID signal. That is, in the master mode, FET 1210 is switched according to the original light ID signal.

On the other hand, when MCU 1206 has not required a command from USB connector 1204, MCU 1206 switches, with a switching signal, a control signal output from selector 1208 to a control signal acquired by synchronization input section 1212. By this switching, modulator 12 is set to the slave mode. When the control signal is an input light ID signal, in the slave mode, FET 1210 is switched according to the input light ID signal.

Here, MCU 1206 of master modulator 12m acquires an input light ID signal, which is a light ID signal output from endmost slave modulator 12s, via synchronization input section 1212. Based on the input light ID signal, MCU 1206 determines whether or not at least one of all slave modulators 12s included in transmitter 100 has failed. When MCU 1206 of master modulator 12m determines that a failure exists, MCU 1206 performs a failure notifying process for notifying the user of the failure.

Figure 5:
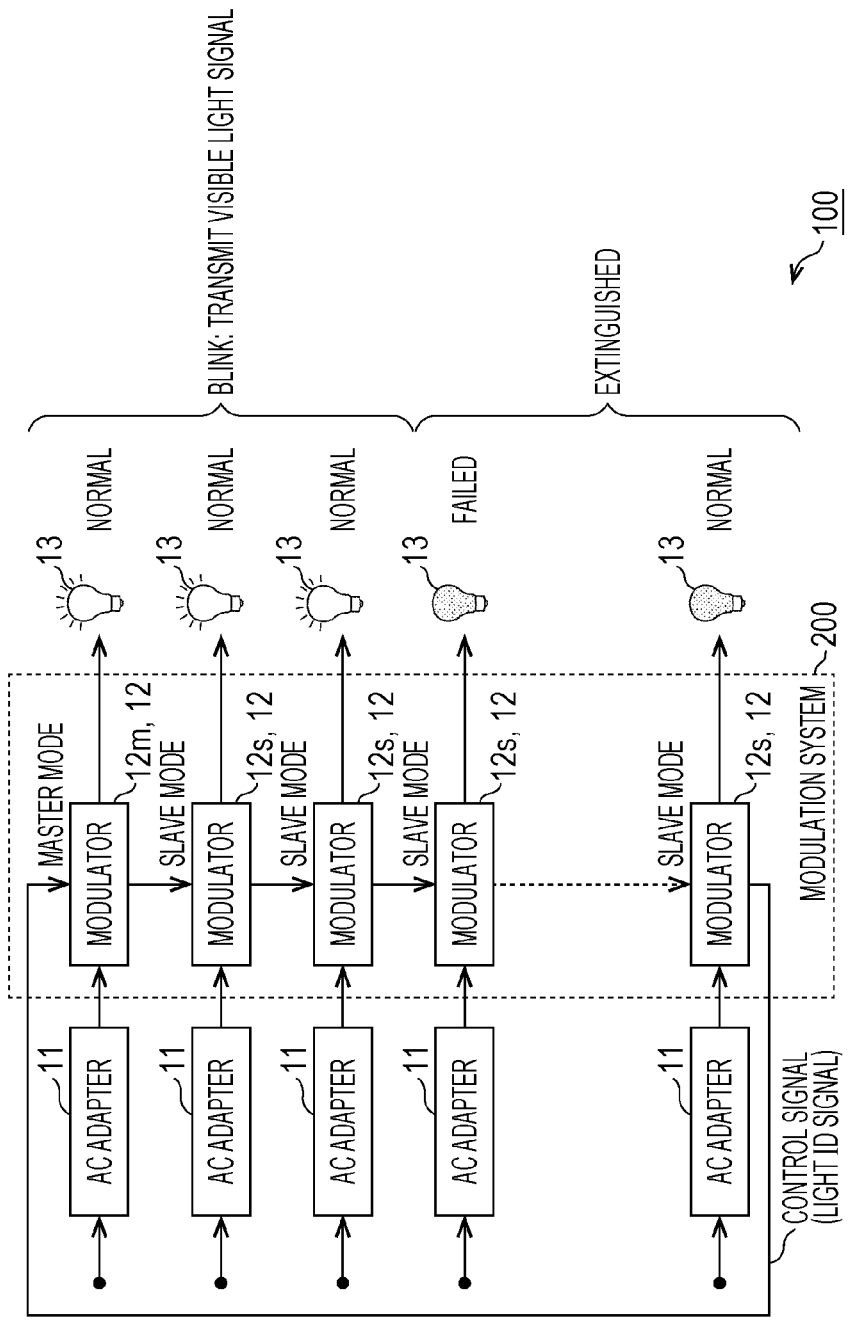
FIG. 5 shows the situation where any one of a plurality of modulators included in the modulation system according to the exemplary embodiment has failed.

FIG. 5 shows the situation where any one of the plurality of modulators 12 included in modulation system 200 has failed.

When any one of the plurality of modulators 12 included in transmitter 100 fails by any reason, failed modulator 12 does not perform blinking of LED 13 according to a light ID signal or output of a light ID signal from synchronization output section 1213. Further, despite their being normal, all modulators 12 following failed modulator 12 (specifically, slave modulators 12s) do not perform blinking of LEDs 13 according to a light ID signal because such a light ID signal cannot be acquired. On the other hand, since all modulators 12 preceding failed modulator 12 generate or acquire a light ID signal, preceding modulators 12 perform blinking of LEDs 13 according to the light ID signal. That is, all modulators 12 preceding failed modulator 12 transmit visible light signals in synchronization with each other.

Here, when failed modulator 12 is master modulator 12m, all LEDs 13 included in transmitter 100 are extinguished. Accordingly, the abnormality in transmitter 100 can be easily found. Further, when failed modulator 12 is slave modulator 12s, as failed slave modulator 12s is nearer to master modulator 12m, a greater number of LEDs 13 included in transmitter 100 are extinguished. That is, when failed slave modulator 12s is near to master modulator 12m, a great number of LEDs 13 included in transmitter 100 are extinguished. Accordingly, the abnormality in transmitter 100 can be easily found without MCU 1206 performing the failure notifying process.

However, when failed slave modulator 12s is far from master modulator 12m, just a small number of LEDs 13 included in transmitter 100 are extinguished. Accordingly, the abnormality in transmitter 100 cannot be easily found without MCU 1206 performing the failure notifying process. Note that, when such abnormality continues, abnormal current may flow into transmitter 100, resulting in a hazardous condition of transmitter 100.

Accordingly, in order to prevent the abnormality from being left, MCU 1206 of master modulator 12m determines whether or not at least one slave modulator 12s has failed based on an input light ID signal. Further, when MCU 1206 of master modulator 12m determines that at least one slave modulator 12s has failed, MCU 1206 performs the failure notifying process for notifying the user of the failure.

MCU 1206 determines, for example, whether or not the input light ID signal is correct. When MCU 1206 determines that the input light ID signal is not correct, MCU 1206 determines that at least one slave modulator 12s has failed.

Specifically, when the input light ID signal is different from the original light ID signal, MCU 1206 determines that the input light ID signal is not correct. Note that, the light ID signal of the input light ID signal and that of the original light ID signal time-divisionally alternate between different two signal levels (High and Low). Here, out of the two signal levels, the high signal level is referred to as High, and the low signal level is referred to as Low.

That is, when the original light ID signal shows one of High and Low and the input light ID signal shows the other one of High and Low, MCU 1206 determines that the input light ID signal is not correct. Specifically, when the input light ID signal constantly shows High while the original light ID signal does not constantly show High, MCU 1206 determines that the input light ID signal is not correct. Conversely, when the input light ID signal constantly shows Low while the original light ID signal does not constantly show Low, MCU 1206 determines that the input light ID signal is not correct.

Alternatively, when the frequency of the input light ID signal is different from the frequency of the original light ID signal, MCU 1206 determines that the input light ID signal is not correct. Specifically, when the frequency of the input light ID signal is higher than the frequency of the original light ID signal, MCU 1206 determines that the input light ID signal is not correct. For example, the frequency of the original light ID signal may be a predetermined frequency, being the carrier wave frequency of the original light ID signal.

Alternatively, when the duty ratio of the input light ID signal is different from the duty ratio of the original light ID signal, MCU 1206 determines that the input light ID signal is not correct. Specifically, when the difference between the duty ratio of the input light ID signal and the duty ratio of the original light ID signal is equal to or greater than a predetermined value, MCU 1206 determines that the input light ID signal is not correct. The predetermined value is, for example, 5%.

Alternatively, when the duty ratio of a signal obtained by XOR of the input light ID signal and the original light ID signal (hereinafter referred to as the sum signal) is higher than a predetermined value, MCU 1206 determines that the input light ID signal is not correct. The predetermined value is, for example, 6%. The value 6% is based on the following. When the input light ID signal and the original light ID signal are completely identical to each other, the sum signal shows constantly Low. However, actually, there exists delay attributed to the circuit between the input light ID signal and the original light ID signal. Accordingly, even if these signals are identical, the sum signal shows High at the timing corresponding to the edges (rising edges and falling edges) of these signals. The period showing High depends on the delay time attributed to the circuit. For example, in the light ID signal, the High period (pulse width) is 100 μs, and the delay time is 3 μs. In this case, there exists a delay of 3 μs between the input light ID signal and the original light ID signal at the timing corresponding to each of the rising edge and the falling edge. Accordingly, it can be said that the input light ID signal is a correct signal when the duty ratio of the sum signal is 6%, and the input light ID signal is not a correct signal when the duty ratio of the sum signal is higher than 6%.

Figure 6:
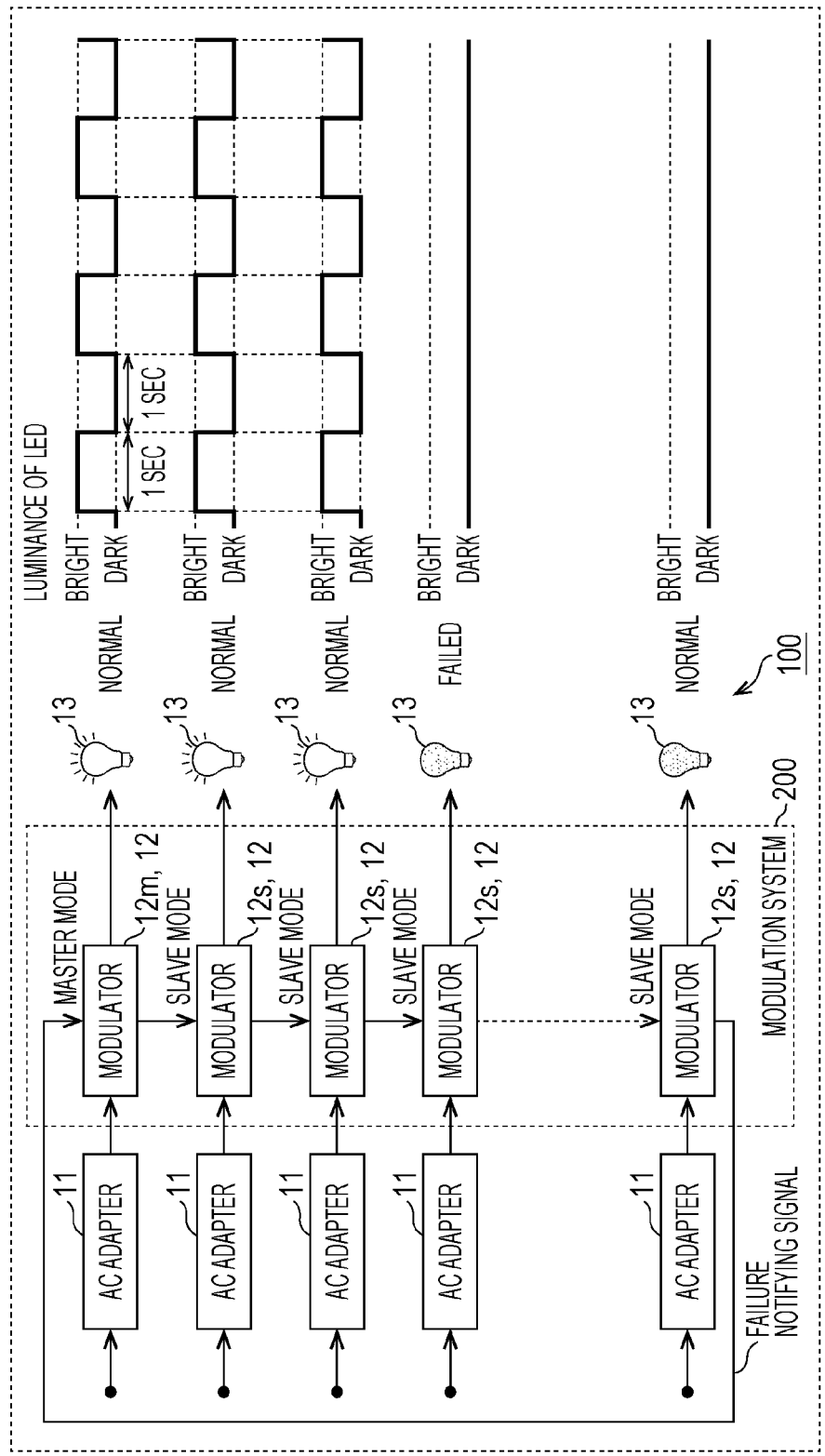
FIG. 6 shows luminance variations of LEDs when a failure notifying process according to the exemplary embodiment is performed.

FIG. 6 shows luminance variations of the LEDs when the failure notifying process is performed.

When MCU 1206 of master modulator 12m determines that failure has occurred, MCU 1206 performs the failure notifying process for notifying the user of the failure. In the failure notifying process, MCU 1206 generates and outputs, instead of a light ID signal, a failure notifying signal which is a control signal for causing LEDs 13 to light up in a predetermined pattern which is visually recognizable to a human. The pattern causes LEDs 13 to blink at the frequency lower than 50 Hz, for example.

By switching FET 1210 according to the failure notifying signal, MCU 1206 of master modulator 12m causes LED 13 corresponding to master modulator 12m to blink according to the pattern visually recognizable to a human. Further, the failure notifying signal is output to following slave modulator 12s. Accordingly, out of the plurality of slave modulators 12s arranged to form an array, all slave modulators 12s preceding failed slave modulator 12s cause their respective corresponding LEDs 13 to blink in synchronization with LED 13 of master modulator 12m. For example, master modulator 12m and slave modulators 12s that precede failed slave modulator 12s repeatedly cause their respective corresponding LEDs 13 to light up for one second and then extinguish them for one second.

Thus, it is possible to easily notify the user of the abnormality of transmitter 100. That is, even in the case where failed slave modulator 12s is far from master modulator 12m and just a small number of LEDs 13 included in transmitter 100 are extinguished, the remaining great number of LEDs 13 noticeably blink. Thus, it is possible to easily notify the user of the abnormality of transmitter 100.

Further, the abnormality of transmitter 100 may include, additionally to the failure of transmission unit 10 (specifically, modulators 12) as described above, reverse connection of AC adapters 11 and LEDs 13 relative to modulators 12. Accordingly, MCU 1206 of master modulator 12m according to the present exemplary embodiment performs a state checking process.

Figure 7:
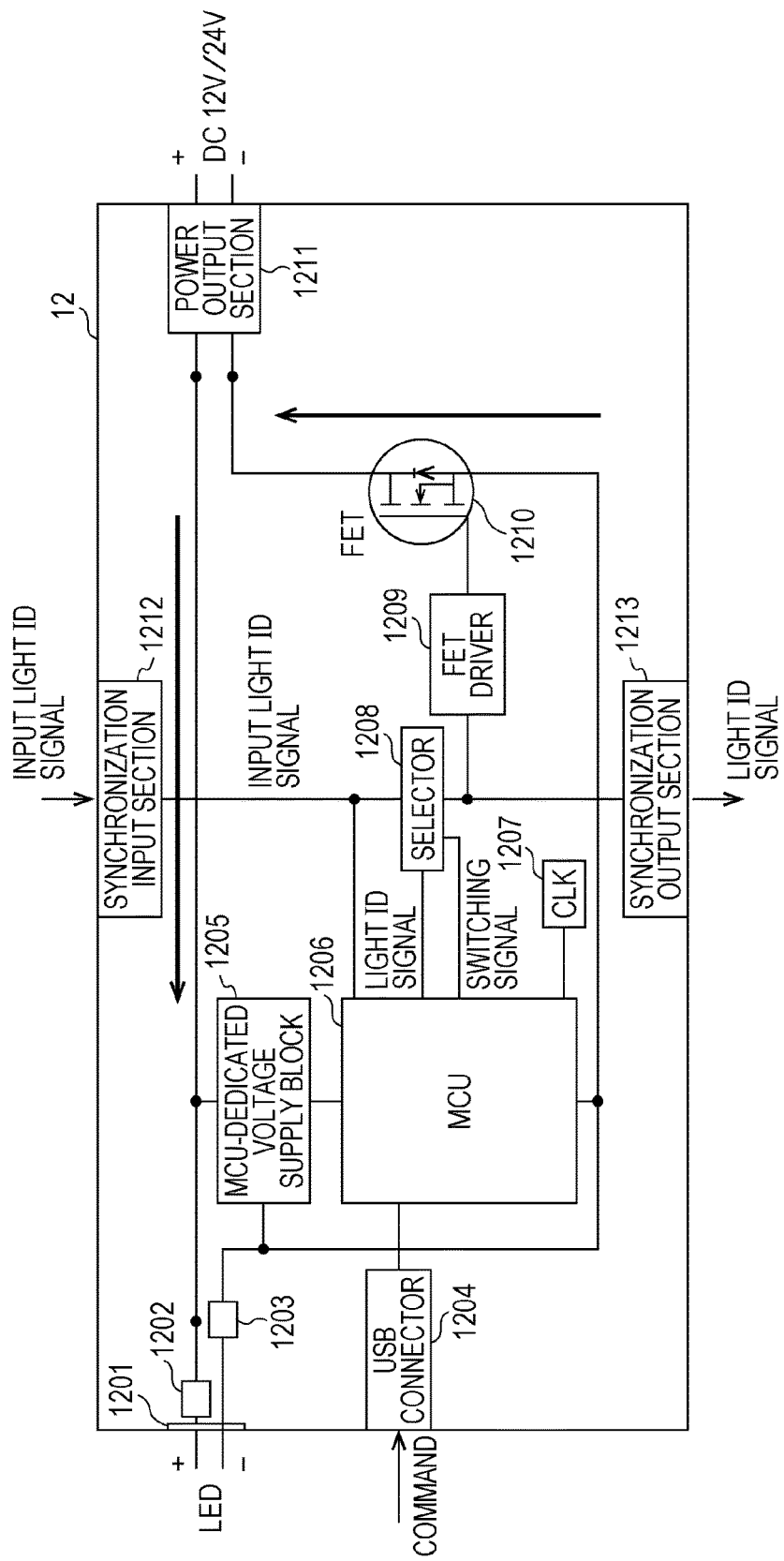
FIG. 7 shows the connection state of the modulator where an AC adapter and an LED are reversely connected according to the exemplary embodiment.

FIG. 7 shows the connection state of one modulator 12 where AC adapter 11 and LED 13 are reversely connected.

In this connection state, AC adapter 11 is connected to power output section 1211 of modulator 12, and LED 13 is connected to power input section 1201 of modulator 12. Note that, such a connection state of modulator 12 is hereinafter referred to as the reversely connected state.

In the reversely connected state, reverse polarity protection circuit 1203 of modulator 12 may not function. Further, in this reversely connected state, current flows between the source and the drain of FET 1210 by the parasitic diode of FET 1210. Accordingly, in this reversely connected state, LED 13 may unintendedly light up. That is, when any modulator 12 in the reversely connected state exists in the plurality of modulators 12 included in transmitter 100, modulator 12 in the reversely connected state causes corresponding LED 13 to light up irrespective of a control signal (specifically, a light ID signal).

On the other hand, modulator 12 in the correctly connected state existing in the plurality of modulators 12 included in transmitter 100 varies the luminance of LED 13 according to a light ID signal. However, in the case where the frequency of the luminance variations of LED 13 is a high frequency which is not visually recognizable to a human, this LED 13 also appears to light up to the user.

Accordingly, with human eyes, modulator 12 in the reversely connected state cannot be found. Further, in the case where modulator 12 in the reversely connected state is small in number in transmitter 100 and modulator 12 in the correctly connected state is great in number, transmitter 100 can transmit a visible light signal to the receiver. As a result, despite occurrence of abnormality, that is, the reversely connected state in transmitter 100, transmitter 100 tends to be left, and may enter a hazardous state.

Accordingly, in order to prevent the abnormality from being left, MCU 1206 of master modulator 12m performs the above-described state checking process upon activation. In the state checking process, MCU 1206 generates an extinguishing signal which is a control signal for extinguishing LEDs 13 for a predetermined period (hereinafter referred to as the extinguishing period) instead of a light ID signal. The extinguishing period is a period during which a human can visually recognize extinguishing of LEDs 13, and may be, for example, several seconds, ten seconds, or several minutes.

Figure 8:
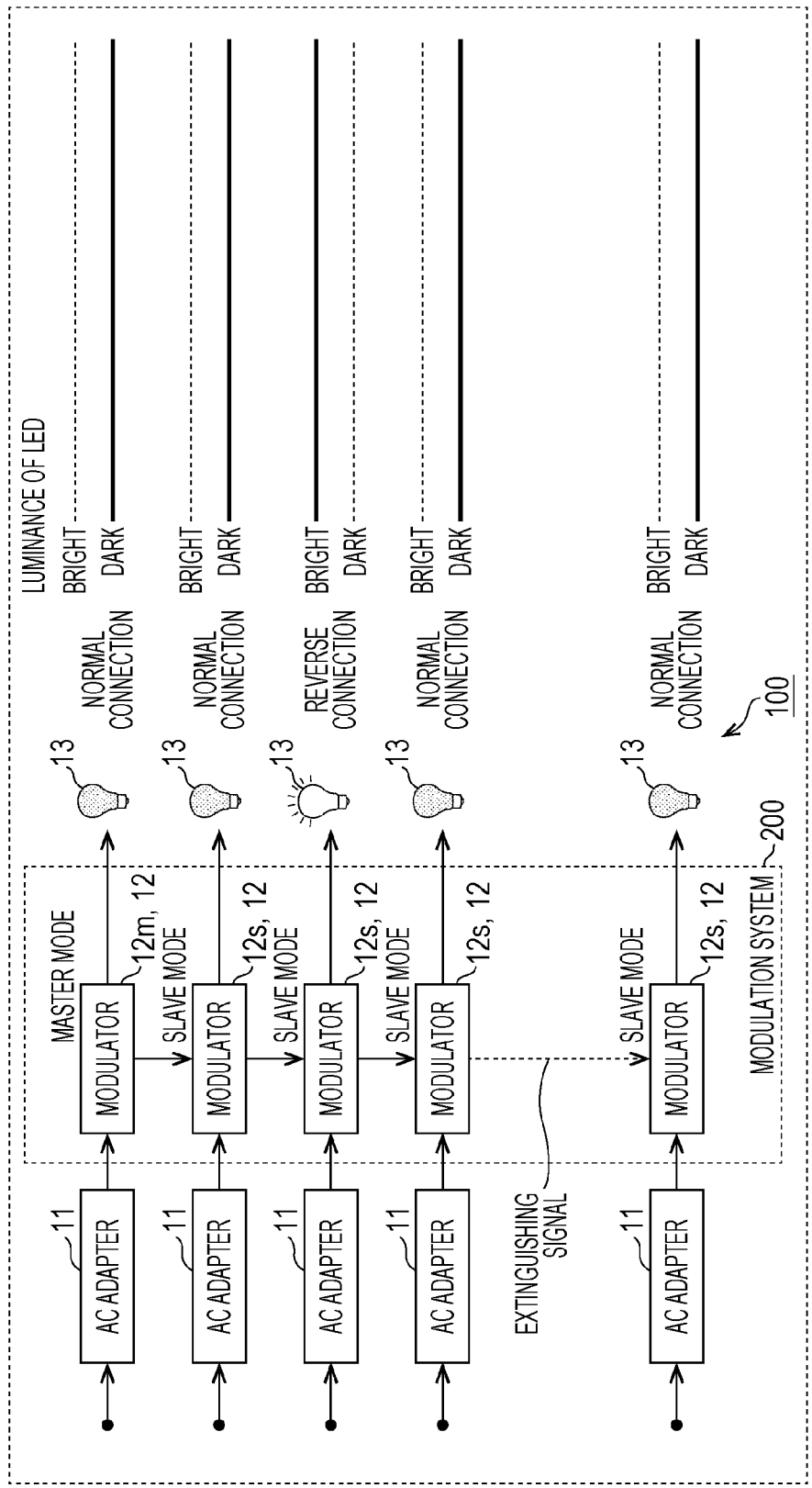
FIG. 8 shows an exemplary state of the transmitter where a state checking process according to the exemplary embodiment is performed.

FIG. 8 shows an exemplary state of transmitter 100 where the state checking process is performed. Note that, in FIG. 8, LEDs 13 corresponding to modulators 12 in the correctly connected state are denoted by the term of "normal connection", and LED 13 corresponding to modulator 12 in the reversely connected state is denoted by the term of "reverse connection".

In the extinguishing period, MCU 1206 of master modulator 12m generates and outputs an extinguishing signal. The extinguishing signal output from master modulator 12m is relayed from the top to the end in the array of the plurality of slave modulators 12s. Thus, in the extinguishing period, LEDs 13 corresponding to modulators 12 in the correctly connected state are extinguished, and just LED 13 corresponding to modulator 12 in the reversely connected state lights up.

Thus, modulator 12 in the reversely connected state can be easily found.

Further, in the state checking process, MCU 1206 of master modulator 12m may generate, as a light-up signal instead of a light ID signal, a control signal for causing LED 13 to light up by a predetermined period during which a human can visually recognize lighting of LED 13, immediately after a lapse of the extinguishing period. The predetermined period during which the human can visually recognize lighting of LED 13 is referred to as the light-up period. Further, in the state checking process, MCU 1206 of master modulator 12m may repeatedly alternate generation of an extinguishing signal in an extinguishing period and generation of a light-up signal in a light-up period. For example, MCU 1206 may repeatedly alternate generation of an extinguishing signal in an extinguishing period of 10 seconds and generation of a light-up signal in a light-up period of 10 seconds.

Thus, modulator 12 in the reversely connected state can more easily be found.

FIG. 9 is a flowchart showing a processing operation of MCU 1206 of modulator 12 according to the present exemplary embodiment.

MCU 1206 firstly determines whether or not it is activated (step S11). When MCU 1206 determines that it is activated (Yes in step S11), MCU 1206 determines whether or not a command is acquired via USB connector 1204 (step S12). When MCU 1206 determines that a command is acquired (Yes in step S12), MCU 1206 sets, with a switching signal, modulator 12 including MCU 1206 to the master mode (step S13). On the other hand, when MCU 1206 determines that a command is not acquired (No in step S12), MCU 1206 sets, with a switching signal, modulator 12 including MCU 1206 to the slave mode (step S14).

Modulator 12 set to the master mode, that is, MCU 1206 of master modulator 12m performs the state checking process. That is, MCU 1206 of master modulator 12m generates an extinguishing signal as a control signal, and outputs the extinguishing signal by the extinguishing period (step S17).

At this time, when there exists any lighting LED 13, modulator 12 corresponding to that LED 13 is in the reversely connected state. That is, by the lighting of LED 13, it is possible to notify the user of the occurrence of abnormality in transmitter 100, i.e., the reversely connected state.

Then, after a lapse of the extinguishing period, MCU 1206 of master modulator 12m generates a light ID signal as a control signal, and starts outputting the light ID signal (step S17). Thus, the plurality of modulators 12 included in transmitter 100 cause their respective corresponding LEDs 13 to blink in synchronization with each other, thereby transmitting a visible light signal.

Here, MCU 1206 of master modulator 12m acquires a light ID signal output from endmost slave modulator 12s in the array of the plurality of slave modulators 12s, as an input light ID signal (step S18). Then, MCU 1206 determines whether or not the input light ID signal is correct. That is, MCU 1206 determines whether or not the input light ID signal is identical to the original light ID signal generated by MCU 1206 itself (step S19). Here, when MCU 1206 determines that the input light ID signal is the original light ID signal (Yes in step S19), that is, when MCU 1206 determines that the input light ID signal is correct, MCU 1206 determines whether or not to end outputting the light ID signal (step S20). When MCU 1206 determines to end (Yes in step S20), MCU 1206 ends all the operations. On the other hand, when MCU 1206 determines not to end (No in step S20), MCU 1206 repeatedly performs operations from step S18.

Further, in step S19, when MCU 1206 determines that the input light ID signal is not identical to the original light ID signal (No in step S19), that is, when MCU 1206 determines that the input light ID signal is not correct, MCU 1206 of master modulator 12*m* performs the failure notifying process. That is, MCU 1206 of master modulator 12*m* generates and outputs, as a control signal, a failure notifying signal instead of a light ID signal.

By the generation and output of the failure notifying signal, LEDs 13 repeatedly light up and are extinguished in a cycle visually recognizable to a human. LEDs 13 which repeatedly perform lighting and extinguishing are LED 13 corresponding to master modulator 12*m* and LEDs 13 corresponding to failure-free slave modulators 12*s* preceding failed slave modulator 12*s* in the array of the plurality of modulators 12.

First Summary of Exemplary Embodiment

Figure 10A:
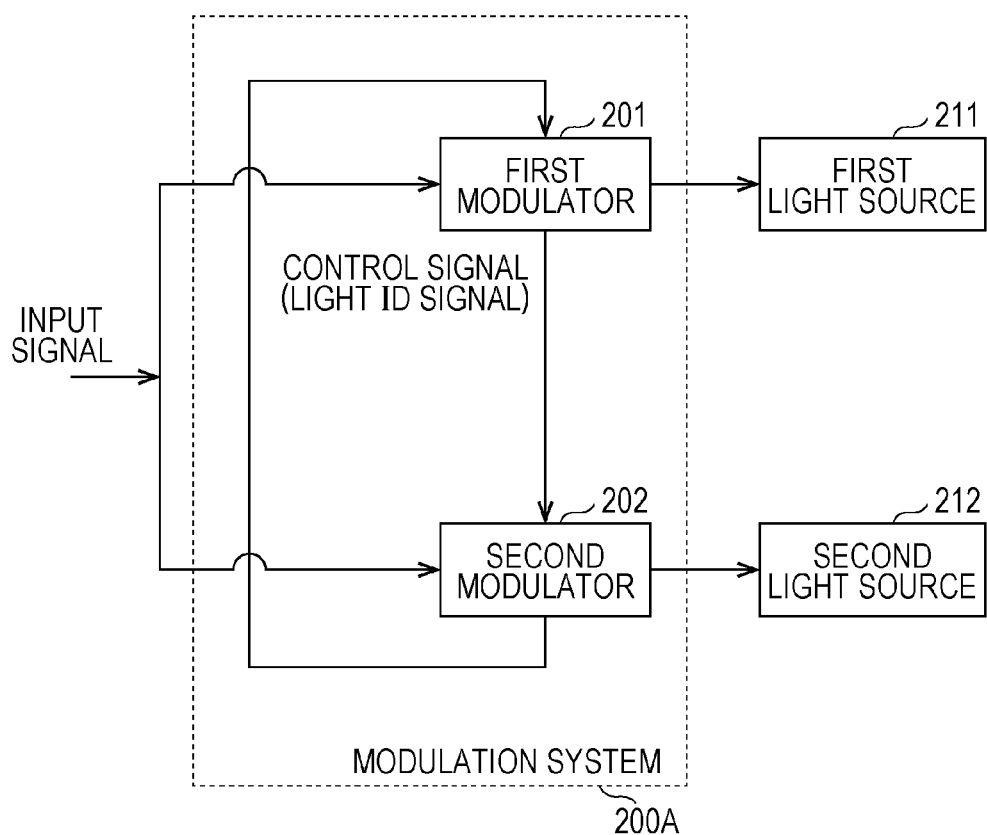
FIG. 10A shows the structure of a modulation system according to one mode of the present disclosure.

FIG. 10A shows the structure of a modulation system according to one mode of the present disclosure.

Modulation system 200A according to one mode of the present disclosure includes first modulator 201 and second modulator 202. Modulation system 200A corresponds to modulation system 200. First modulator 201 corresponds to master modulator 12*m*. Second modulator 202 corresponds to slave modulator 12*s*.

First modulator 201 generates a control signal, and modulates an input signal in accordance with the generated control signal. Thus, first modulator 201 controls the luminance of first light source 211 that emits light according to the modulated input signal, and outputs the control signal. Second modulator 202 acquires the control signal output from first modulator 201, and modulates an input signal in accordance with that control signal. Thus, second modulator 202 controls the luminance of second light source 212 that emits light according to the modulated input signal, and outputs the control signal.

Here, first modulator 201 generates a control signal for transmitting a visible light signal by the luminance variations of first light source 211 as a light ID signal (light information signal). Further, first modulator 201 acquires the above-described light ID signal being the control signal output from second modulator 202.

Thus, the input signal is modulated by each of first modulator 201 and second modulator 202 in accordance with the identical light ID signal, and output to first light source 211 and second light source 212. Accordingly, the luminance variations of first light source 211 and those of second light source 212 can be synchronized with each other, and a visible light signal with high luminance can be transmitted. Further, the light ID signal output from second modulator 202 is acquired by first modulator 201. Accordingly, first modulator 201 can determine whether or not the light ID signal generated by first modulator 201 itself has been correctly acquired by second modulator 202, that is, whether or not second modulator 202 has failed. Specifically, first modulator 201 can determine whether or not second light source 212 shows the luminance variations in synchronization with first light source 211, by second modulator 202 modulating the input signal in accordance with the light ID signal generated by first modulator 201. As a result, the abnormality in modulation system 200A can be easily found.

Further, modulation system 200A may include a plurality of second modulators 202 each structured as second modulator 202 and arranged in a predetermined order to form an array. In this case, each of the plurality of second modulators 202 acquires and outputs a control signal in accordance with the order in the array of the plurality of second modulators 202 such that the control signal is relayed from the top to the end of the array. First modulator 201 acquires, as an input light ID signal (an input light information signal), the light ID signal being the control signal output from endmost second modulator 202 in the array.

Thus, in the case where modulation system 200A includes a plurality of second modulators 202 also, a light ID signal generated by first modulator 201 is successively relayed in the plurality of second modulators 202 in order, and ultimately acquired by first modulator 201. Accordingly, first modulator 201 can determine whether or not the light ID signal generated by first modulator 201 itself has been correctly acquired by the plurality of second modulators 202, that is, whether or not at least one of the plurality of second modulators 202 has failed.

Further, first modulator 201 may include a processor, and the processor may determine whether or not at least one of the plurality of second modulators 202 has failed based on the above-described input light ID signal.

Further, the processor may determine whether or not the input light ID signal is correct. When the processor determines that the input light ID signal is not correct, the processor may determine that at least one of the plurality of second modulators 202 has failed. For example, the processor may determine that an input light ID signal is not correct when the input light ID signal is different from the original light ID signal which is the light ID signal generated by first modulator 201. Specifically, when the original light ID signal shows one of different two signal levels and an input light ID signal shows the other one of the different two signal levels, the processor may determine that the input light ID signal is not correct.

Alternatively, when the frequency of an input light ID signal is different from the frequency of the original light ID signal, the processor may determine that the input light information signal is not correct. In this case, when the frequency of an input light ID signal is higher than the frequency of the original light ID signal, the processor may determine that the input light ID signal is not correct.

Alternatively, when the duty ratio of an input light ID signal is different from the duty ratio of the original light ID signal, the processor may determine that the input light ID signal is not correct. In this case, when the difference between the duty ratio of an input light ID signal and the duty ratio of the original light ID signal is equal to or greater than a predetermined value, the processor may determine that the input light ID signal is not correct.

Thus, whether or not at least one second modulator 202 has failed can be more properly determined.

Further, when the processor determines that at least one of the plurality of second modulators 202 has failed, the processor may further generate and output, as a control signal, a failure notifying signal that causes first light source 211 to blink in a pattern visually recognizable to a human. Alternatively, when the processor determines that at least one of the plurality of second modulators 202 has failed, the processor may further generate and output, as a control signal, a failure notifying signal that extinguishes first light source 211.

Thus, for example, even if the number of second light sources 212 being extinguished by the failure of any second modulator 202 is small and therefore the user cannot easily found the failure just by the extinguishing of those second light sources 212, the remaining great number of second light sources 212 blink or are extinguished in a pattern that is visually recognizable to a human. Accordingly, the user can easily find that at least one of the plurality of second modulators 202 has failed.

Further, an illumination device according to one mode of the present disclosure may be an illumination device including modulation system 200A. Further, a display according to one mode of the present disclosure may be a display including modulation system 200A. Further, a projector according to one mode of the present disclosure may be a projector including modulation system 200A. Note that, the illumination device, the display, or the projector may include modulation system 200 according to the exemplary embodiment instead of modulation system 200A.

Thus, any abnormality in the device such as the illumination device, the display, or the projector can be easily found.

Figure 10B:
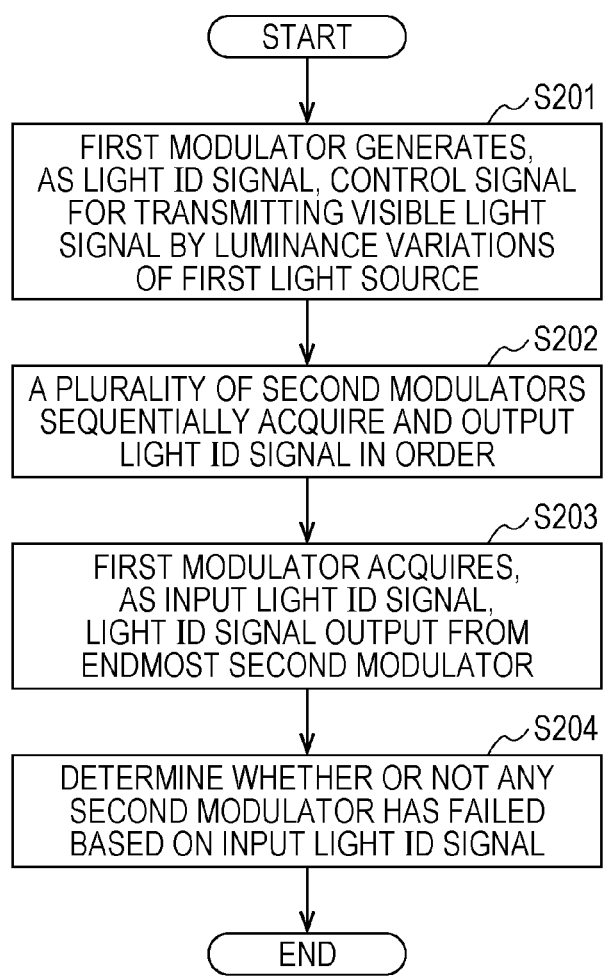
FIG. 10B is a flowchart showing a modulation method according to one mode of the present disclosure.

FIG. 10B is a flowchart showing a modulation method according to one mode of the present disclosure.

In the modulation method, a modulation system modulates an input signal. Further, the modulation system includes a first modulator, and a plurality of second modulators arranged to form an array in a predetermined order. The first modulator generates a control signal, and modulates an input signal in accordance with the generated control signal. Thus, the first modulator controls the luminance of a first light source that emits light according to the modulated input signal, and outputs the control signal. The plurality of second modulators each acquire the control signal and modulate an input signal according to the control signal. Thus, the second modulators control the luminance of second light sources that emits light according to the modulated input signal, and output the control signal.

The modulation method with such a modulation system includes operations of steps S201 to S204. In step S201, the first modulator generates, as a light ID signal, a control signal for transmitting a visible light signal by luminance variations of the first light source. In step S202, the plurality of second modulators each acquire and output the light ID signal in accordance with the order in the array of the second modulators such that the light ID signal output from the first modulator is relayed from the top to the end of the array of the second modulators. In step S203, the first modulator acquires, as an input light ID signal, the light ID signal output from the endmost second modulator in the array. In step S204, the first modulator determines whether or not at least one of the plurality of second modulators has failed based on that input light ID signal.

Thus, the input signal is modulated by each of the first modulator and the second modulator in accordance with an identical light ID signal, and output to the first light source and the second light source. Accordingly, the luminance variations of the first light source and those of the second light source can be synchronized with each other, and a visible light signal being high in luminance can be transmitted. Further, the light ID signal output from the second modulator is acquired by first modulator 201 as an input light ID signal. Accordingly, the first modulator can determine whether or not the light ID signal generated by the first modulator itself has been correctly acquired by the plurality of second modulators, that is, whether or not the plurality of second modulators have failed. Specifically, the first modulator can determine whether or not the plurality of second light sources show luminance variations in synchronization with the first light source, by each of the plurality of second modulators modulating an input signal in accordance with the light ID signal generated by the first modulator. As a result, abnormality in the modulation system can be easily found.

Second Summary of Exemplary Embodiment

Figure 11A:
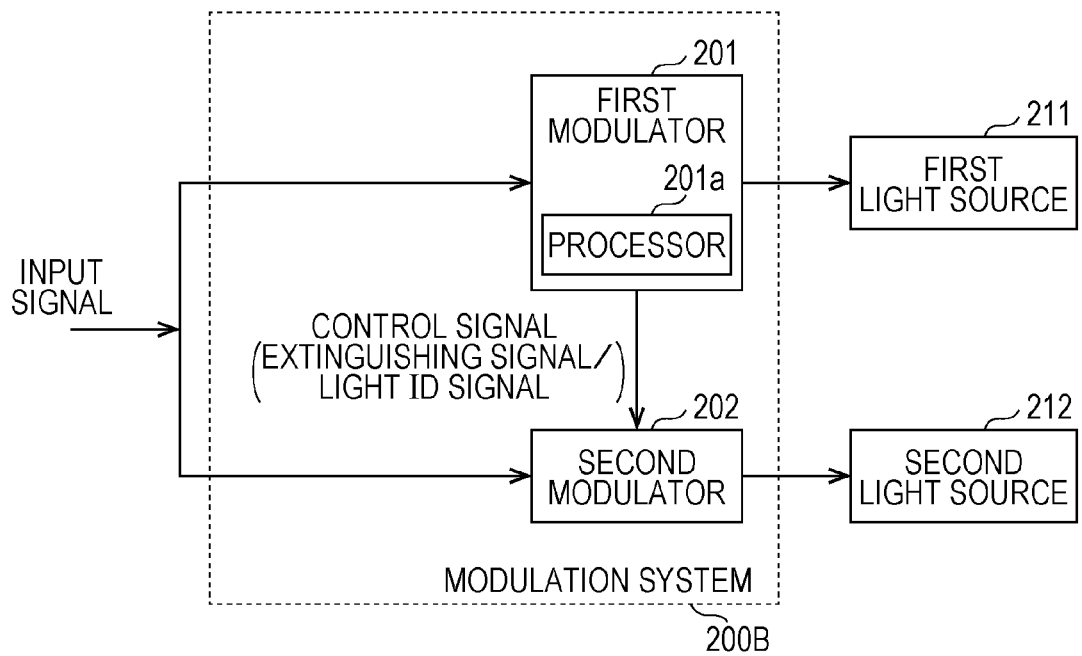
FIG. 11A shows the structure of a modulation system according to another mode of the present disclosure.

FIG. 11A shows the structure of a modulation system according to another mode of the present disclosure.

Modulation system 200B according to another mode of the present disclosure includes first modulator 201 and second modulator 202. Modulation system 200B corresponds to modulation system 200. First modulator 201 corresponds to master modulator 12*m*. Second modulator 202 corresponds to slave modulator 12*s*.

First modulator 201 generates a control signal, and modulates an input signal in accordance with the generated control signal. Thus, first modulator 201 controls the luminance of first light source 211 that emits light according to the modulated input signal, and outputs the control signal. Second modulator 202 acquires the control signal output from first modulator 201, and modulates an input signal in accordance with that control signal. Thus, second modulator 202 controls the luminance of second light source 212 that emits light according to the modulated input signal.

Here, first modulator 201 includes processor 201*a*. Processor 201*a* corresponds to MCU 1206. Upon activation, processor 201*a* generates, as an extinguishing signal, a control signal for extinguishing first light source 211 by a predetermined extinguishing period during which a human can visually recognize extinguishing of first light source 211. After a lapse of the extinguishing period, processor 201*a* generates, as a light ID signal (light information signal), a control signal for transmitting a visible light signal by luminance variations of the first light source.

Here, in the case where power supply (e.g., AC adapter 11) is connected to the input section of second modulator 202 for acquiring an input signal as supply voltage from the outside, and second light source 212 is connected to the output section of second modulator 202 for outputting the modulated input signal to the outside, the luminance variations of second light source 212 are caused to synchronize with the luminance variations of first light source 211 according to the light ID signal. Conversely, in the case where second light source 212 is connected to the input section of second modulator 202 and power supply is connected to the output section of second modulator 202, the luminance variations of second light source 212 are not caused to synchronize with the luminance variations of first light source 211 according to the light ID signal. Note that, in the case where second light source 212 is connected to the input section and the power supply is connected to the output section, second modulator 202 is in the reversely connected state. In such a reversely connected state, second modulator 202 causes second light source 212 to light up irrespective of a light ID signal. Further, in the case where second light source 212 is connected to the input section and the power supply is connected to the output section, second modulator 202 causes second light source 212 to light up irrespective of an extinguishing signal output from first modulator 201 as a control signal.

Thus, when processor 201a of first modulator 201 is activated, an extinguishing signal is generated and output to second modulator 202. Accordingly, when second modulator 202 is not in the reversely connected state but in the correctly connected state, second light source 212 is extinguished. However, when second modulator 202 is in the reversely connected state, second light source 212 lights up irrespective of an extinguishing signal. As a result, the user can easily find abnormality, that is, the reversely connected state of second modulator 202 in modulation system 200B. Further, when second modulator 202 is correctly connected at the timing where a light ID signal is generated after a lapse of the extinguishing period, first light source 211 and second light source 212 can vary their luminance in synchronization with each other according to the light ID signal, to transmit a visible light signal with high luminance.

Further, modulation system 200B may include a plurality of second modulators 202 each structured as second modulator 202 and arranged to form an array in a predetermined order. The plurality of second modulators 202 each acquire and output the control signal in accordance with the order in the array of second modulators 202 such that the control signal is relayed from the top to the end of the array of second modulators 202.

Thus, in the case where modulation system 200B includes a plurality of second modulators 202 also, a control signal generated by first modulator 201 is successively relayed in the plurality of second modulators 202 in order. Accordingly, when an extinguishing signal is generated as a control signal, just second light source 212 corresponding to second modulator 202 in the reversely connected state out of the plurality of second modulators 202 can be caused to light up. As a result, the user can easily find the abnormality, that is, the reversely connected state of second modulator 202 in modulation system 200B. Further, when the plurality of second modulators 202 are correctly connected when a light ID signal is generated as a control signal after a lapse of the extinguishing period, the luminance variations of first light source 211 and those of second light sources 212 can be synchronized with each other according to the light ID signal, to transmit a visible light signal.

Further, the processor may further generate, as a light-up signal, a control signal for causing first light source 211 to light up by a predetermined light-up period during which a human can visually recognize lighting of first light source, immediately after a lapse of the extinguishing period. Further, the processor may repeatedly alternate generation of an extinguishing signal in an extinguishing period and generation of a light-up signal in a light-up period, and generate a light ID signal after the repeatedly performed generation of the extinguishing signal and the light-up signal.

Thus, the user can more easily find abnormality, that is, the reversely connected state of second modulator 202 in modulation system 200B.

Further, modulator 12 according to one mode of the present disclosure is a modulator that modulates an input signal (e.g., supply voltage) for causing LED 13 being the light source to light up, and as shown in FIG. 4, modulator 12 includes FET 1210 and MCU 1206. FET 1210 is a switch that switches the signal level of an input signal. MCU 1206 is a processor which generates a control signal, and controls FET 1210 in accordance with the generated control signal, to modulate an input signal. Further, the luminance of LED 13 is controlled according to the modulated input signal. Here, upon activation, MCU 1206 generates, as an extinguishing signal, a control signal for extinguishing LED 13 by a predetermined extinguishing period during which a human can visually recognize extinguishing of LED 13. Further, after a lapse of the extinguishing period, MCU 1206 generates, as a light ID signal, a control signal for transmitting a visible light signal by the luminance variations of LED 13.

Thus, when MCU 1206 of modulator 12 is activated, an extinguishing signal is generated. Accordingly, when modulator 12 is not in the reversely connected state but in the correctly connected state, LED 13 is extinguished. However, when modulator 12 is in the reversely connected state, LED 13 lights up irrespective of the extinguishing signal. As a result, the user can easily find abnormality, that is, the reversely connected state of modulator 12. Further, when modulator 12 is correctly connected when a light ID signal is generated after a lapse of the extinguishing period, LED 13 can vary its luminance according to the light ID signal, and hence can transmit a visible light signal.

Figure 11B:
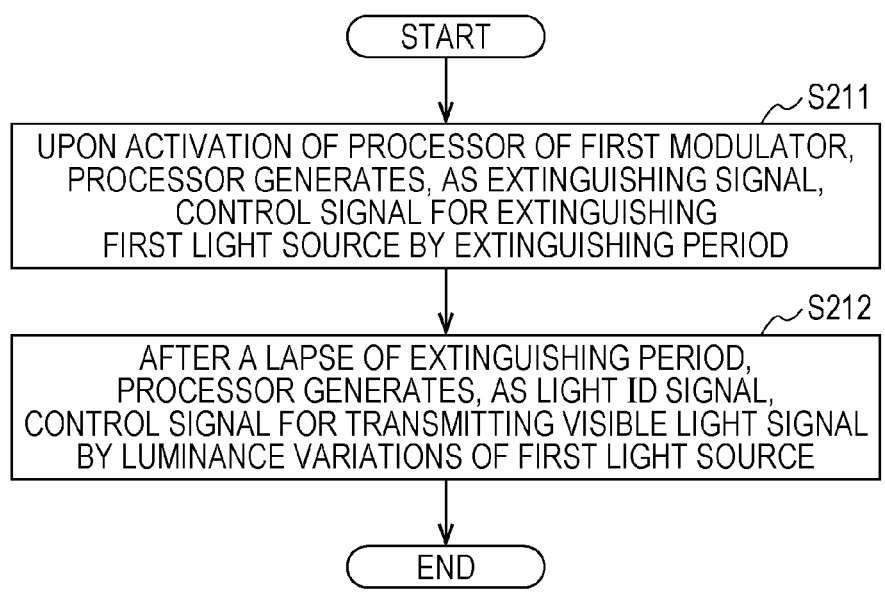
FIG. 11B is a flowchart showing a modulation method according to another mode of the present disclosure.

FIG. 11B is a flowchart showing a modulation method according to another mode of the present disclosure.

In the modulation method, a modulation system modulates an input signal. Further, the modulation system includes a first modulator and a second modulator. The first modulator generates a control signal, and modulates an input signal in accordance with the generated control signal. Thus, the first modulator controls the luminance of a first light source that emits light according to the modulated input signal, and outputs the control signal. The second modulator acquires the control signal output from the first modulator, and modulates an input signal in accordance with the control signal. Thus, the second modulator controls the luminance of a second light source that emits light according to the modulated input signal.

The modulation method with such a modulation system includes operations of step S211 and step S212. In step S211, upon activation of a processor included in the first modulator, the processor generates, as an extinguishing signal, a control signal for extinguishing the first light source by a predetermined extinguishing period during which a human can visually recognize extinguishing of the first light source. In step S212, after a lapse of the extinguishing period, the processor generates, as a light ID signal, a control signal for transmitting a visible light signal by the luminance variations of the first light source.

Thus, when the processor of the first modulator is activated, an extinguishing signal is generated and output to the second modulator. Accordingly, when the second modulator is not in the reversely connected state but in the correctly connected state, the second light source is extinguished. However, when the second modulator is in the reversely connected state, the second light source lights up irrespective of the extinguishing signal. As a result, the user can easily find abnormality, that is, the reversely connected state of the second modulator in the modulation system. Further, when the second modulator is correctly connected at the timing where the light ID signal is generated after a lapse of the extinguishing period, the first light source and the second light source can vary their luminance in synchronization with each other according to the light ID signal, to transmit a visible light signal with high luminance.

Other Exemplary Embodiments

Note that, in the above-described exemplary embodiment, the constituents may each be implemented by dedicated hardware, or may be realized by executing a software program suitable for the constituents. The constituents may be realized by a program executor such as a CPU or a processor reading and executing a software program recorded on a recording medium such as hard disk or a semiconductor memory. Here, the software that realizes the modulator in the exemplary embodiment may be a program that causes a computer to execute, for example, the steps included in the flowchart of FIGS. 9, 10B, and 11B.

In the foregoing, while a description has been made of the modulation system according to one or a plurality of modes based on the exemplary embodiment, the present disclosure is not limited to the exemplary embodiment. The scope of the present disclosure may include the present exemplary embodiment having undergone any modification contemplated by a person skilled in the art, and a combination of constituents in a different exemplary embodiment, without deviating from the spirit of the present disclosure.

For example, while USB connector 1204 acquires a command in the exemplary embodiment, any connector other than a USB connector may acquire a command. Further, modulator 12 according to the exemplary embodiment shown in FIG. 4 may further include a buffer, an antistatic component, or an anti-noise component. The antistatic component may be, for example, a Zener diode or a varistor, and the anti-noise component may be, for example, a bypass capacitor and an electromagnetic interference (EMI) suppression filter. Further, the failure notifying signal according to the exemplary embodiment may not be a control signal that causes LED 13 to blink, but may be a control signal that constantly extinguishes LED 13. Alternatively, the failure notifying signal according to the exemplary embodiment may be a control signal that causes LED 13 to blink such that, for example, a message of SOS according to the Morse code is transmitted. Further, in the exemplary embodiment, while the signal level of High is 12 V or 24 V, it may be a higher or lower voltage value than that. Similarly, in the exemplary embodiment, while the signal level of Low is 0 V, it may be a higher voltage value than that.

Further, in the exemplary embodiment, MCU 1206 performs the failure notifying process of detecting failure of slave modulator 12s and notifying the user of the failure, and the reversely connected state checking process. Here, in accordance with a command, at least one of the processes may be switched between ON and OFF. This command is a command acquired by USB connector 1204. Thus, by supplying a command instructing turning ON or OFF the failure notifying process or the state checking process to USB connector 1204 of modulator 12, whether or not to cause modulator 12 to perform these processes may be switched.

The present disclosure is applicable to, for example, a modulation system that includes a plurality of modulators that modulate an input signal, an illumination device, a display, or a projector including that modulation system.

What is claimed is:

1. A system comprising:
   a first modulator configured to (i) generate a control signal, (ii) modulate a first voltage value of the first modulator to be more than or equal to a predetermined value or less than to the predetermined value according to the control signal, to control luminance of a first light source, and (iii) output the control signal; and
   a second modulator configured to (i) acquire the control signal output from the first modulator and (ii) modulate a second voltage value of the second modulator to be more than or equal to the predetermined value or less than the predetermined value according to the control signal, to control luminance of a second light source, and (iii) output the control signal to the first modulator,
   wherein the first modulator (i) generates, as a light information signal, the control signal for transmitting a visible light signal by change in luminance of the first light source, and (ii) acquires the light information signal being the control signal output from the second modulator.

2. The system according to claim 1, further comprising a plurality of second modulators each structured as the second modulator and arranged in a predetermined order to form an array,
   wherein the plurality of second modulators each acquire and output the control signal in accordance with the order in the array of the plurality of second modulators, such that the control signal is relayed from a top to an end of the array, and
   the first modulator acquires, as an input light information signal, the light information signal being the control signal output from an endmost one of the second modulators in the array.

3. The system according to claim 2, wherein the first modulator determines whether or not at least one of the plurality of second modulators has failed based on the input light information signal.

4. The system according to claim 3, wherein the first modulator determines whether or not the input light information signal is correct, and when the first modulator determines that the input light information signal is not correct, the first modulator determines that at least one of the plurality of second modulators has failed.

5. The system according to claim 4, wherein the first modulator determines that the input light information signal is not correct when the input light information signal is different from an original light information signal being the light information signal generated by the first modulator.

6. The system according to claim 5, wherein the first modulator determines that the input light information signal is not correct when the original light information signal is at one of two different signal levels and the input light information signal is at other one of the two different signal levels.

7. The system according to claim 5, wherein the first modulator determines that the input light information signal is not correct when a frequency of the input light information signal is different from a frequency of the original light information signal.

8. The system according to claim 7, wherein the first modulator determines that the input light information signal is not correct when the frequency of the input light information signal is higher than the frequency of the original light information signal.

9. The system according to claim 5, wherein the first modulator determines that the input light information signal is not correct when a duty ratio of the input light information signal is different from a duty ratio of the original light information signal.

10. The system according to claim 9, wherein the first modulator determines that the input light information signal is not correct when a difference between the duty ratio of the input light information signal and the duty ratio of the original light information signal is equal to or greater than a predetermined value.

11. The system according to claim 4, wherein, when the first modulator determines that at least one of the plurality of second modulators has failed, the first modulator further generates and outputs, as the control signal, a failure notifying signal that causes the first light source to blink in a pattern to be recognized by a human.

12. The system according to claim 4, wherein, when the first modulator determines that at least one of the plurality of second modulators has failed, the first modulator further generates and outputs, as the control signal, a failure notifying signal that extinguishes the first light source.

13. An illumination device comprising the system according to claim 1.

14. A display comprising the system according to claim 1.

15. A projector comprising the system according to claim 1.

16. A method for modulating an input signal, the method comprising:

generating, by a master modulator, a light information signal, which is a control signal for transmitting a visible light signal by a change in luminance of a first light source;

modulating, by the master modulator, the input signal according to the control signal, to control luminance of the first light source;

outputting, by the master modulator, the light information signal to a first slave modulator of a plurality of slave modulators arranged in a predetermined order;

acquiring and outputting, by each of the plurality of slave modulators, the light information signal in accordance with the predetermined order, such that the light information signal output from the master modulator is relayed from the first slave modulator to a last slave modulator of the plurality of slave modulators in the predetermined order;

modulating, by the plurality of slave modulators, the input signal according to the acquired light information signal, to control luminance of respective second light sources;

acquiring, by the master modulator, as an input light information signal, the light information signal output from the last slave modulator; and determining, by the master modulator, whether or not at least one of the plurality of slave modulators has failed based on the input light information signal.

* * * * *